(12) United States Patent
Hoyer et al.

(10) Patent No.: US 9,433,899 B2
(45) Date of Patent: Sep. 6, 2016

(54) METHOD FOR REMOVING CARBON MONOXIDE AND HYDROCARBONS FROM THE EXHAUST GAS OF LEAN-BURN INTERNAL COMBUSTION ENGINES

(71) Applicant: Umicore AG & CO. KG, Hanau-Wolfgang (DE)

(72) Inventors: Ruediger Hoyer, Alzenau-Hoerstein (DE); Anke Schuler, Woerth (DE); Stefan Franoschek, Nettetal (DE); Thomas R. Pauly, Alzenau (DE); Gerald Jeske, Neuberg (DE)

(73) Assignee: UMICORE AG & CO. KG, Hanau (DE)

( * ) Notice: Subject to any disclaimer, the term of this patent is extended or adjusted under 35 U.S.C. 154(b) by 0 days.

(21) Appl. No.: 14/390,765

(22) PCT Filed: Mar. 26, 2013

(86) PCT No.: PCT/EP2013/056360
§ 371 (c)(1),
(2) Date: Oct. 3, 2014

(87) PCT Pub. No.: WO2013/149881
PCT Pub. Date: Oct. 10, 2013

(65) Prior Publication Data
US 2016/0051930 A1 Feb. 25, 2016

Related U.S. Application Data

(60) Provisional application No. 61/635,307, filed on Apr. 19, 2012.

(30) Foreign Application Priority Data

Apr. 5, 2012 (EP) .................................... 12163305

(51) Int. Cl.
*B01D 53/94* (2006.01)
*F01N 3/20* (2006.01)
*B01D 53/96* (2006.01)
*F02D 41/02* (2006.01)
*F02D 41/14* (2006.01)

(52) U.S. Cl.
CPC ......... *B01D 53/944* (2013.01); *B01D 53/9495* (2013.01); *B01D 53/96* (2013.01); *F02D 41/027* (2013.01); *F02D 41/1446* (2013.01); *B01D 2255/1021* (2013.01); *B01D 2255/1023* (2013.01); *B01D 2255/1025* (2013.01); *B01D 2255/2063* (2013.01); *B01D 2255/2065* (2013.01); *B01D 2255/2092* (2013.01); *B01D 2258/012* (2013.01)

(58) Field of Classification Search
CPC ............................. B01D 53/944; F01N 3/103
See application file for complete search history.

(56) References Cited

U.S. PATENT DOCUMENTS

| | | |
|---|---|---|
| 4,153,579 A | 5/1979 | Summers et al. |
| 5,001,103 A | 3/1991 | Koberstein et al. |
| 5,130,109 A | 7/1992 | Wan |
| 5,212,142 A | 5/1993 | Dettling |
| 5,286,699 A | 2/1994 | Ohata et al. |
| 5,514,354 A | 5/1996 | Domesle et al. |
| 5,627,124 A * | 5/1997 | Farrauto ............. B01D 53/864 502/304 |
| 5,744,103 A | 4/1998 | Yamada et al. |
| 5,855,854 A * | 1/1999 | Shinzawa ............ B01D 53/944 422/171 |
| 5,928,981 A | 7/1999 | Leyrer et al. |
| 5,993,762 A * | 11/1999 | Rajaram .............. B01D 53/944 423/213.2 |
| 6,255,249 B1 | 7/2001 | Voss et al. |
| 6,342,465 B1 | 1/2002 | Klein et al. |
| 6,519,930 B1 | 2/2003 | Maus et al. |
| 7,313,911 B2 | 1/2008 | Pfeifer et al. |
| 8,420,035 B2 | 4/2013 | Maletz et al. |
| 2003/0051469 A1 | 3/2003 | Loerch et al. |
| 2009/0247399 A1* | 10/2009 | Mizutani ............. B01D 53/944 502/178 |
| 2010/0183490 A1 | 7/2010 | Hoke et al. |
| 2014/0205508 A1* | 7/2014 | Baba ........................ B01J 23/63 422/177 |
| 2015/0224478 A1* | 8/2015 | Bergeal ................ B01D 53/945 423/213.2 |

FOREIGN PATENT DOCUMENTS

| | | |
|---|---|---|
| CN | 1032749 A | 5/1989 |
| CN | 1252120 A | 5/2000 |
| DE | 3940758 A1 | 6/1991 |
| DE | 4435073 A1 | 4/1995 |
| DE | 19614540 A1 | 10/1997 |
| DE | 19753738 A1 | 6/1999 |

(Continued)

OTHER PUBLICATIONS

Verdier, S., Rohart, E., Larcher, O., Harle, V. et al., "Innovative Materials for Diesel Oxidation Catalysts, with High Durability and Early Light-Off," SAE Technical Paper 2005-01-0476, 2005, doi:10.4271/2005-01-0476.

Hauptmann, W., Votsmeier, M., Gieshoff, J., Drochner, A., Vogel, H., "Inverse hysteresis during the NO oxidation on Pt under lean conditions", Applied Catalysis B: Environmental. 93 (2009) 22-29.

Notification of Transmittal of the International Search Report (with English translation) and The Written Opinion for Application No. PCT/EP2012/056360 mailed Jul. 18, 2013.

J. Leyrer et al., "*Advanced Studies on Diesel Aftertreatment Catalysts for Passenger Cars*", SAE Technical Paper Series, 960133, Feb. 26-29, 1996.

(Continued)

*Primary Examiner* — Timothy Vanoy
(74) *Attorney, Agent, or Firm* — Smith, Gambrell & Russell, LLP

(57) ABSTRACT

The invention relates to a method for removing carbon monoxide and hydrocarbons from the exhaust gas of lean-burn internal combustion engines, said exhaust gas being passed over a catalyst which contains platinum supported on one or more refractory supporting materials, pure cerium oxide, and optionally an additional noble metal selected from the group consisting of platinum, palladium and rhodium, wherein the pure cerium oxide is in close contact with the noble metal.

14 Claims, 3 Drawing Sheets

(56) References Cited

FOREIGN PATENT DOCUMENTS

Figure 1:
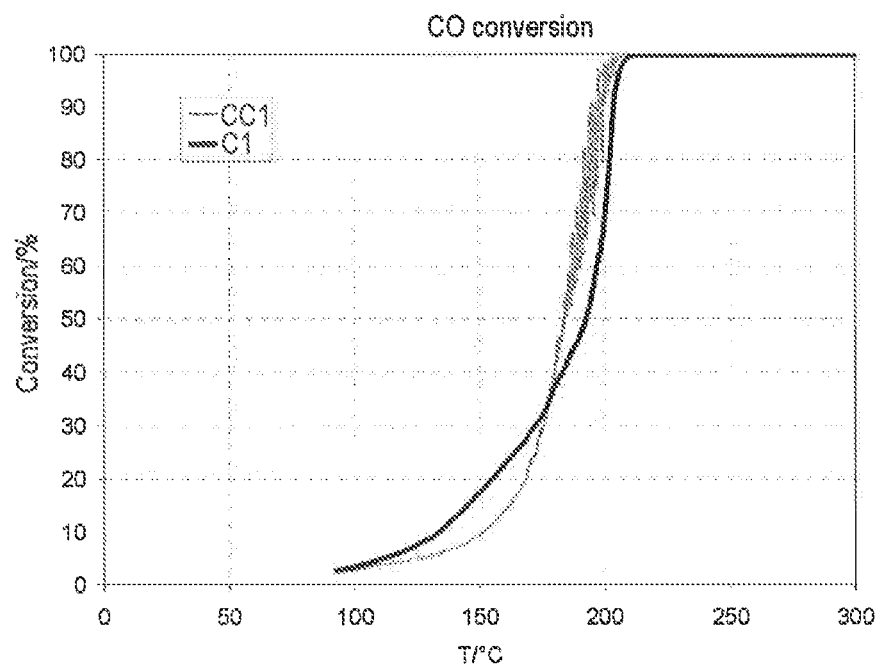

| | | |
|---|---|---|
| DE | 10017203 A1 | 10/2001 |
| DE | 10308288 A1 | 9/2004 |
| EP | 0142858 A2 | 5/1985 |
| EP | 0251752 A1 | 1/1988 |
| EP | 0304095 A2 | 2/1989 |
| EP | 0 427 970 A2 | 5/1991 |
| EP | 0443765 A1 | 8/1991 |
| WO | 93/10885 A1 | 6/1993 |
| WO | 9310885 A1 | 6/1993 |
| WO | 97/00119 A1 | 1/1997 |
| WO | 9700119 A1 | 1/1997 |
| WO | 98/42437 A1 | 10/1998 |
| WO | 2009/068289 A2 | 6/2009 |

OTHER PUBLICATIONS

Notification of Transmittal of the International Search Report (with English translation) and the Written Opinion for Application No. PCT/EP2013/056360 mailed Jul. 18, 2013.

\* cited by examiner

METHOD FOR REMOVING CARBON MONOXIDE AND HYDROCARBONS FROM THE EXHAUST GAS OF LEAN-BURN INTERNAL COMBUSTION ENGINES

The present invention relates to a method for removing carbon monoxide and hydrocarbons from the exhaust gas of lean-burn internal combustion engines, i.e. for example from diesel engines, at very low temperatures.

Oxidation catalysts for removing the pollutant gases carbon monoxide (CO) and hydrocarbons (HC) from the exhaust gas of diesel and other lean-burn internal combustion engines are well known from the prior art and are based predominantly on platinum and aluminum oxide. Examples of diesel oxidation catalysts can be found in the documents DE10308288 A1, DE19614540 A1, DE19753738 A1, DE3940758 A1, EP 0427970 A2 and DE4435073 A1. They use the oxygen present in relatively large quantities in diesel exhaust gas to oxidize said pollutant gases into carbon dioxide ($CO_2$) and water vapor.

One problem with diesel engines is that the exhaust gas temperatures are frequently too low to ensure catalytic activity of the catalyst. For instance, in part-load operation of a diesel engine temperatures are between just 100° C. and 250° C. and only in full-load operation are temperatures of 550° C. to 650° C. reached. Efficiency increases in modern diesel engines are more likely to lower average exhaust gas temperatures in the future. To achieve sufficient catalytic activity, the catalyst must therefore have a very low light-off temperature. The light-off temperature is defined as the temperature at which the catalyst achieves conversion of 50% of the carbon monoxide or hydrocarbons. However, achieving a reduction in the HC light-off temperature is difficult, since in particular saturated and aromatic hydrocarbons can only be oxidized with difficulty.

According to the prior art, this problem may for example be solved by adding HC-storing zeolites to the catalyst. These zeolites store hydrocarbons in the cold operating state and only release them for conversion at relatively high temperatures. One example of a catalyst with an HC store is described in SAE Technical Paper Series "Advanced Studies on Diesel Aftertreatment Catalysts for Passenger Cars", 1996. However, this method does not have any influence on the HC light-off behavior of the catalyst, in particular with regard to CO.

Under lean exhaust gas conditions the noble metal may be present in oxidation states >0 in particular through oxidation with $NO_2$ (see Appl. Catal. B: Environ. 93 (2009) 22-29), which leads to an increase in the light-off temperature for CO and HC. This is in particular the case when using cerium oxide as supporting material for the noble metals, which leads to a further increase in the light-off temperature (see SAE2005-01-0476). However, sintering of the noble metals, which leads to a decrease in catalyst activity, is markedly lower on cerium oxide than on supports based on aluminum oxide or zirconium oxide. WO2009/068289 A2 therefore explicitly proposes a catalyst which does not contain any cerium oxide.

It is an object of the present invention to provide a method for removing carbon monoxide and hydrocarbons from the exhaust gas of lean-burn internal combustion engines, in which method the CO light-off temperature is below 130° C.

This object is achieved by methods for removing carbon monoxide and hydrocarbons from the exhaust gas of lean-burn internal combustion engines, wherein the exhaust gas is passed over a catalyst which contains (i) platinum supported on one or more refractory supporting materials,
(ii) pure cerium oxide, and, if the ratio of platinum to cerium oxide is ≤0.5 (calculated as Pt in g/cft:cerium oxide in g/l),
(iii) an additional noble metal selected from the group consisting of platinum, palladium, rhodium and mixtures thereof, the pure cerium oxide (ii) being in close contact with platinum (i) and, if included, additional noble metal (iii), characterized in that, after a limit temperature exposure under lean exhaust gas conditions is exceeded, the catalyst is exposed for a short time to rich exhaust gas to regenerate catalytic activity.

Conventionally, the quantity of platinum supported on the refractory supporting material amounts to from 0.5 to 10 wt. %, preferably from 1 to 5 wt. %, in each case relative to component (i).

Relative to the total weight of components (i) to (iii), the quantity of platinum (i) preferably amounts to 0.4 to 2 wt. %, particularly preferably 1 to 1.6 wt. %.

In one embodiment of the present invention, component (i) also comprises palladium, i.e. palladium is also supported on the refractory supporting material in addition to platinum. In this case, the quantity of palladium is preferably selected such that, relative to component (i), a ratio by weight of Pt:Pd of 2:1 to 10:1 results.

Component (i) refractory supporting materials on which the platinum or platinum and palladium is/are supported which may be considered are any materials familiar to a person skilled in the art for this purpose. Such materials have a BET surface area of 50 to 250 m²/g, preferably of 100 to 200 m²/g (determined according to DIN 66132) and are in particular aluminum oxide, silicon oxide, magnesium oxide, titanium oxide, cerium oxide, zeolite, and mixtures or mixed oxides thereof.

Aluminum oxide, magnesium/aluminum mixed oxides and aluminum/silicon mixed oxides are preferred. If aluminum oxide is used, it is particularly preferably stabilized, for example with lanthanum oxide.

Coating of the refractory supports with platinum or palladium proceeds in accordance with known methods, for example the "incipient wetness" method using water-soluble platinum or palladium compounds.

The term "pure cerium oxide" denotes in the context of the present invention a product which contains 90 to 100 wt. % cerium oxide relative to the total weight of the pure cerium oxide. The pure cerium oxide preferably contains 95 to 100 wt. % cerium oxide and particularly preferably 98 to 100 wt. % cerium oxide.

Pure cerium oxides for use according to the invention are known and commercially available.

If the ratio of platinum to cerium oxide is ≤0.5 (in g/cft:g/l), the catalyst to be used according to the invention comprises an additional noble metal (iii). However additional noble metal (iii) may be present even if the ratio of platinum to cerium oxide is >0.5 (in g/cft:g/l).

The additional noble metal (iii) may be platinum, palladium and/or rhodium depending on requirements. It is preferably used in quantities of 0 to 0.5 wt. %, particularly preferably of 0 to 0.2 wt. %, relative to the total weight of components (i) to (iii). If the additional noble metal (iii) has to be present (because the ratio of platinum to cerium oxide is ≤0.5 (in g/cft:g/l)), the quantity preferably amounts to 0.01 to 0.5 wt. %, particularly preferably 0.01 to 0.2 wt. %, relative to the total weight of components (i) to (iii).

According to the invention, the pure cerium oxide (ii) is in close contact with platinum and/or palladium according to (i) and, if included, with an additional noble metal according to (iii).

The expression "in close contact" means in the context of the present invention that the noble metal is in direct connection with the surface of the cerium oxide (ii). However, this does not mean that the noble metal has to be deposited on the surface of the cerium oxide or is supported thereon, even if this represents a possible variant. Rather, the noble metal may also be supported on another supporting material apart from pure cerium oxide and nonetheless be in close contact with pure cerium oxide according to component (ii).

The "close contact" between cerium oxide (ii) and the platinum or palladium supported on one or more refractory supporting materials may be brought about for example by intensive mixing of the components, for example by grinding cerium oxide with component (i).

Likewise, the "dose contact" between cerium oxide (ii) and the additional noble metal (iii) may be brought about in that additional noble metal (iii) supported on one or more supports is mixed intensively with pure cerium oxide. This may be achieved for example by grinding the two components. It goes without saying that the "close contact" between cerium oxide (ii) and the additional noble metal (iii) may however also be brought about by the per se known "incipient wetness" method.

If the additional noble metal (iii) is deposited on a support other than pure cerium oxide according to (ii), any supporting materials familiar to a person skilled in the art for this purpose may be used. Suitable supporting materials are for instance aluminum oxide, silicon oxide, magnesium oxide, titanium oxide, cerium oxide, zeolite, and mixtures or mixed oxides thereof. Aluminum oxide, magnesium/aluminum mixed oxides and aluminum/silicon mixed oxides are preferred. If aluminum oxide is used, it is particularly preferably stabilized, for example with lanthanum oxide.

The meaning of such expressions as "lean exhaust gas", "rich exhaust gas", "lean exhaust gas conditions" and "rich exhaust gas conditions" is known to a person skilled in the art. In the case of a stoichiometric air/fuel mixture, in which the quantity of air present is precisely that which is theoretically required for complete combustion of the fuel, the lambda value is said to be 1 ($\lambda=1$). If air is present in excess, conditions are said to be lean, the exhaust gas conditions or the corresponding exhaust gas being "lean" ($\lambda>1$). If, on the contrary, air is present in a sub-stoichiometric quantity, conditions are said to be rich, the exhaust gas conditions or the corresponding exhaust gas being "rich".

The catalyst to be used according to the invention may be obtained simply by mixing the constituents thereof in the desired quantity ratios and be used in this form.

Conventionally, the catalyst to be used according to the invention is however present in the form of a coating on a catalytically inert supporting body.

Any known supporting bodies for heterogeneous catalysts are in principle suitable as catalytically inert supporting bodies. Monolithic and monolith-like flow-through honeycomb bodies of ceramics and metal, and particulate filter substrates, as conventionally used for purifying diesel engine exhaust gases, are preferred. Ceramic flow-through honeycomb bodies and ceramic wall-flow filter substrates of cordierite, aluminum titanate or silicon carbide are very particularly preferred.

Coating of the supporting body with the catalyst to be used according to the invention proceeds in a known manner, in particular in that a coating suspension ("washcoat"), which contains the constituents of the catalyst to be used according to the invention or precursors thereof, is applied to the supporting body and then dried and calcined. Application may proceed using known methods, such as the dip-, vacuum- and/or pump-coating methods. A washcoat for coating a supporting body with the catalyst to be used according to the invention is more preferably an aqueous suspension which contains, in addition to optionally necessary auxiliaries, refractory supporting material coated with platinum (component (i)), pure cerium oxide (component (ii)) and a soluble platinum or palladium compound (as precursor of component (iii)).

The method according to the invention in particular includes, after a limit temperature exposure under lean exhaust gas conditions is exceeded, exposing the catalyst for a short time to rich, i.e. oxygen-poor, exhaust gas to regenerate catalytic activity.

To prevent misunderstandings, it is explicitly pointed out that this regeneration is not the known regeneration of an NO storage catalyst which takes place when the storage capacity thereof is exhausted and $NO_x$ breaks through, but is instead the regeneration of an oxidation catalyst which takes place when said catalyst has undergone a previously defined limit temperature exposure.

"For a short time" means in this connection the time required for the entire catalyst to come into contact with rich exhaust gas. This time is dependent on the state of the catalyst, the catalyst volume and the volumetric flow rate and as a rule amounts to 1-10 seconds.

The limit temperature exposure is defined in one embodiment of the present invention as the limit temperature which, if exceeded, triggers regeneration. The limit temperature is dependent on the desired $T_{50}$ value for CO light-off. At a $T_{50}$ value for CO light-off of 150° C., said temperature is in particular 400° C. and at a $T_{50}$ value for CO light-off of 125° C., said temperature is in particular 350° C.

In a further embodiment of the present invention, the limit temperature exposure is defined as the residence time of the catalyst in one or more previously defined temperature classes which, if exceeded, trigger regeneration.

In this case, the method according to the invention is preferably performed in such a way that a.) the temperature of the catalyst is measured or simulated and the residence time in a temperature class is determined or the residence time in a plurality of defined temperature classes is determined and added up, b.) on an upper limit for the residence time being exceeded, the need for regeneration (=rich phase) of the catalyst is identified, c.) on or after the temperature falling below a regeneration temperature, the engine is changed over to rich exhaust gas for a short period (1-10 s), and d.) on or after completion of regeneration of the catalyst with rich exhaust gas, the residence times of all the temperature classes are reset to zero.

The temperature classes are as a rule defined in a manner representative of the exhaust gas temperatures of given driving states, such as urban, interurban or freeway travel or in a manner representative of given operating states, such as particle filter regeneration or indeed in a manner representative of temperature ranges in which the upper limit of the residence time does not vary greatly.

The upper limit of the residence time for each individual temperature class is generally fixed in such a way that, after it has been exceeded, a predetermined conversion is no longer achieved within a given test cycle (for example 75% of the EURO5 limit value for carbon monoxide in the NEDC (New European Driving Cycle)).

The need for regeneration or activation (=rich phase) may be identified by way of the sum of the residence times in a plurality of temperature classes, as well as by way of exceeding of the residence time in one individual temperature class. If the sum of the residence times is used, it is advantageous to add the relative residence times (=current residence time divided by the upper limit) of the individual temperature classes and to identify the need for regeneration or activation on a predetermined total limit value (for example 100% or 120%) being exceeded.

If, on identification of the need for regeneration or activation, the catalyst is in a higher temperature class (for example during freeway travel or particulate filter regeneration), in which the residence time until regeneration or activation is short, regeneration would quickly be required again after completed regeneration. However, this is not necessary, since residual activity is as a rule sufficient in these temperature classes.

Therefore, in the method according to the invention, regeneration or activation (=rich phase) is initiated only when the temperature of the catalyst is below a given temperature, known as the regeneration temperature, at which the residence time in the relevant temperature class is sufficiently long until the next requirement of an activation or activation, respectively. This is typically the case at catalyst temperatures of below 350° C., preferably below 250° C.

In a further embodiment of the present invention, the engine is switched off when it is exposed to rich exhaust gas. In this way, regeneration of the catalyst takes place while the engine is switched off.

The catalyst to be used according to the invention may, in particular if it is present as a coating on an inert supporting body, be used in known manner alone or as a constituent of a catalyst system for removing carbon monoxide and hydrocarbons in the method according to the invention.

The invention is explained in greater detail with reference to the following examples and figures, in which:

FIG. 1: shows CO conversion as a function of the temperature (CO light-off) of comparison catalyst CC1 and of catalyst C1 to be used according to the invention under typical diesel conditions after conditioning under lean conditions.

Figure 2:
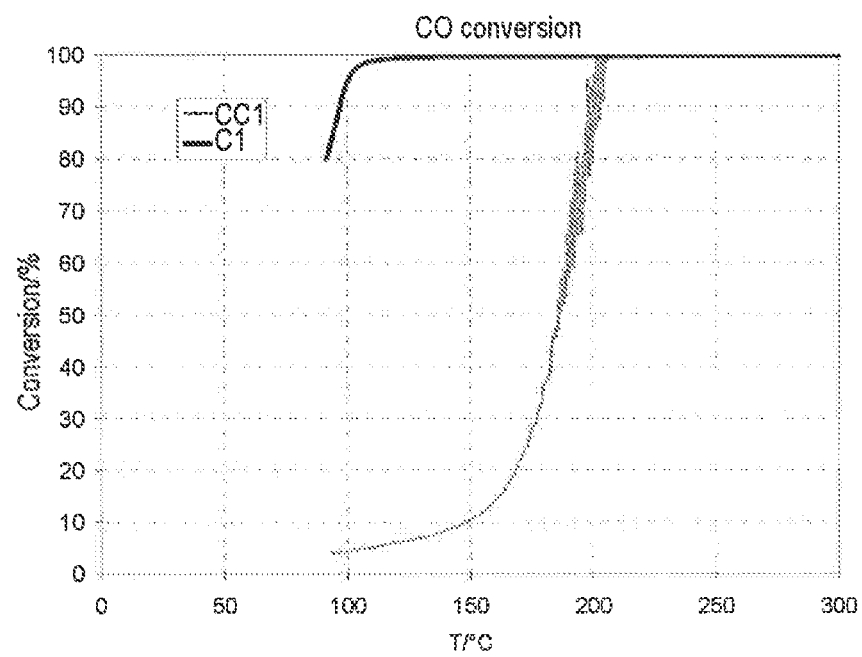

FIG. 2: shows CO conversion as a function of the temperature (CO light-off) of comparison catalysts CC1 and of catalyst C1 to be used according to the invention after regeneration (application of 3 lean/rich cycles).

Figure 3:
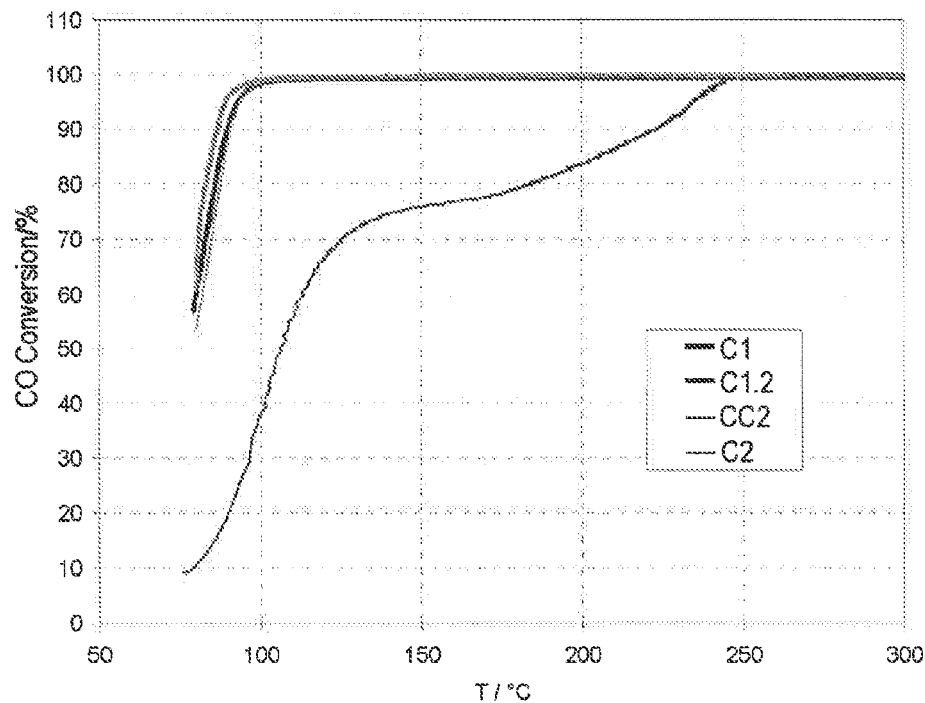

FIG. 3: shows CO conversion as a function of the temperature (CO light-off) of comparison catalyst CC2 and of catalysts C1, C1.2 and C2 to be used according to the invention after regeneration (application of 3 lean/rich cycles).

Figure 4:
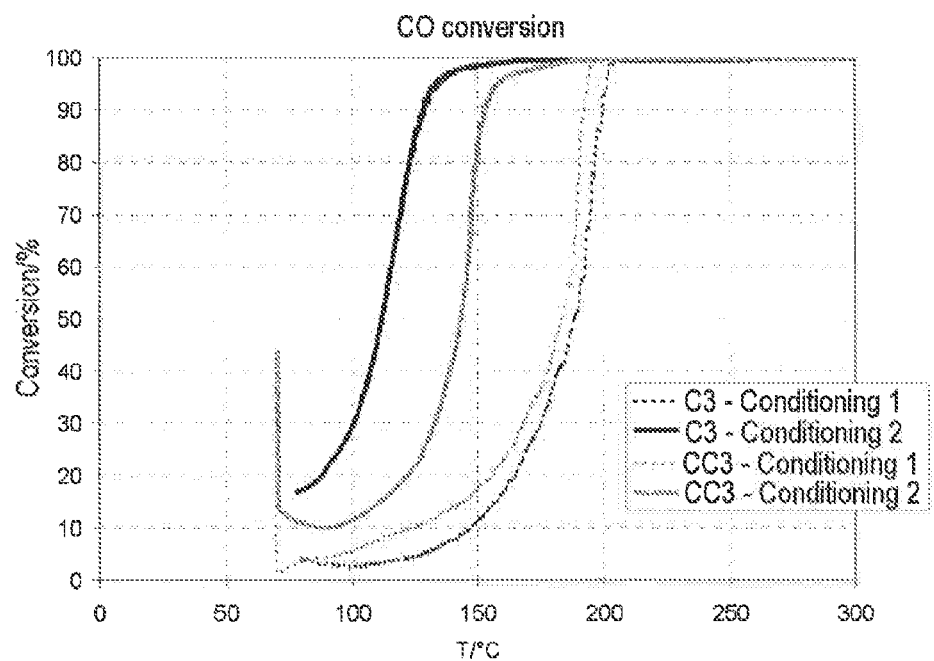

FIG. 4: shows CO conversion as a function of the temperature (CO light-off) of comparison catalyst CC3 and of catalyst C3 to be used according to the invention after regeneration (conditioning 1 and conditioning 2)

Figure 5:
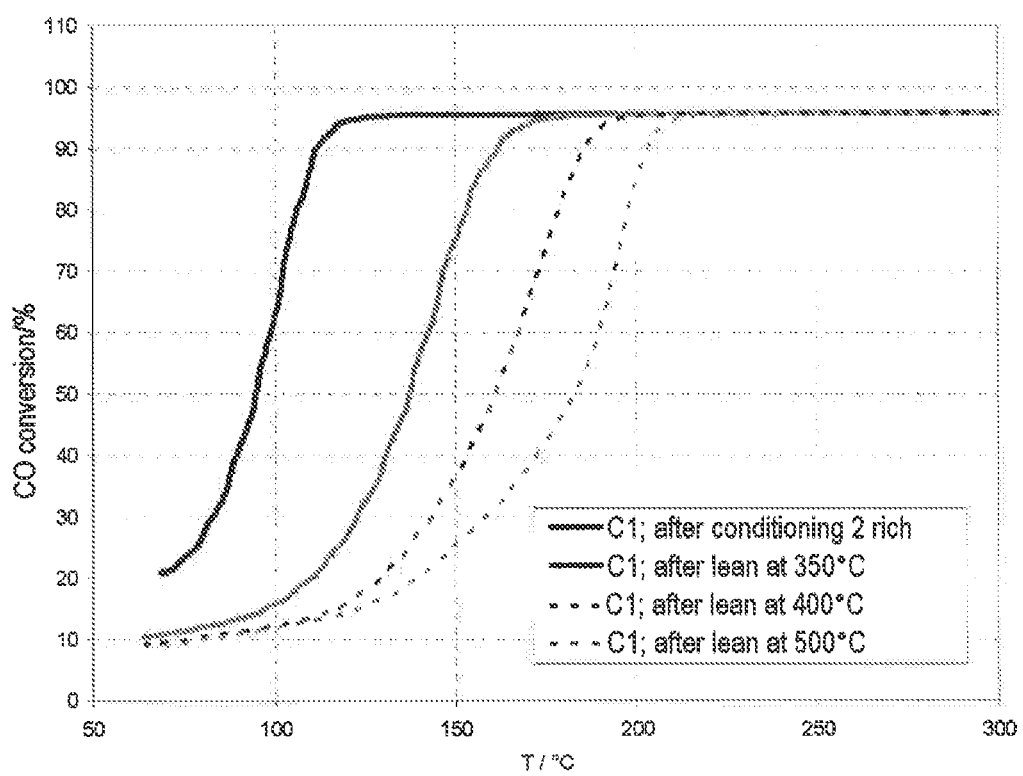

FIG. 5: shows influence of temperature history of catalyst C1 to be used according to the invention on the CO conversion curves.

The catalysts investigated in the following examples consist of various components. These components were in each case processed to yield an aqueous coating dispersion, with which flow-through honeycomb bodies of cordierite with a cell density of 62 cm$^{-2}$ (number of flow channels in the honeycomb bodies per cross-sectional area) were coated using a dip-coating method. The coated honeycomb bodies were dried and then calcined in air at 500° C. for a period of 2 hours. The CO light-off behavior of the resultant finished catalysts was investigated after synthetic aging in a laboratory model gas installation. The catalysts were aged by being stored at a temperature of 800° C. for a period of 16 hours in a hydrothermal atmosphere, i.e. 10 vol % $O_2$ and 10 vol % $H_2O$ in nitrogen.

Test Conditions;

In a laboratory model gas installation the CO light-off behavior of the thermally pretreated ("aged") catalysts was determined from the following examples and comparative examples. To this end, the test specimens were installed in the reactor of the model gas installation and subjected to the following test procedure:

1. To represent typical diesel conditions, in which the catalyst is only in contact with lean exhaust gas, the test specimens were heated to 550° C. at a heating rate of 7.5° C. per minute in the exhaust gas composition "conditioning 1" and then cooled back down to 80° C.

2. The catalysts were then heated for light-off to 550° C. at a heating rate of 7.5° C. per minute to determine CO light-off behavior in the exhaust gas composition. CO conversion was then calculated in accordance with the formula $$\text{CO conversion } [\%] = 100\% \times (c(CO)_{in} - c(CO)_{out})/c(CO)_{in}.$$

In this formula:

$c(CO)_{in}$ denotes the concentration of CO at the catalyst inlet $c(CO)_{out}$ denotes the concentration of CO at the catalyst outlet.

3. To represent CO light-off behavior, the test specimens were subjected three times in succession to "conditioning 2", which consists of a 200 second long "lean" phase and a subsequent 5 second long "rich" phase.

4. After cooling to 80° C., CO conversion was again determined in accordance with the above-described light-off procedure.

| Component | Conditioning 1 | Conditioning 2 lean phase | Conditioning 2 rich phase | Light-off |
|---|---|---|---|---|
| NO [ppm] | 50 | 25 | 25 | 50 |
| $NO_2$ [ppm] | 50 | 25 | 25 | 50 |
| $O_2$ [vol %] | 5 | 7 | 2 | 5 |
| CO [ppm] | 1000 | 1000 | 4 | 1000 |
| HC [ppm] ($C_3H_6/C_3H_8 = 1/1$) | 150 | 150 | 800 | 150 |
| $CO_2$ [vol %] | 6 | 6 | 6 | 6 |
| $H_2O$ [vol %] | 6.6 | 6.6 | 6.6 | 6.6 |
| Balance $N_2$ | Remainder | Remainder | Remainder | Remainder |
| Space velocity [1/h] | 50000 | 36000 | 48000 | 50000 |
| Duration [sec] | 300 | 200 | 5 | |

COMPARATIVE EXAMPLE 1

Comparison Catalyst CC1

To produce a Pt-based oxidation catalyst, a lanthanum-stabilized aluminum oxide with 3 wt. % $La_2O_3$ relative to the total weight of the mixed oxide was coated with platinum from platinum tetraamine acetate using the "incipient wetness" method. After thermal fixing of the platinum, the powder was suspended in water and a flow-through honeycomb body of cordierite with a cell density of 62 cm$^{-1}$ was coated with 100 g/l of this suspension using a dip-coating method. The honeycomb body was then dried and calcined in air at 500° C. for a period of 2 hours. The resultant catalyst CC1 contained 3.53 g/l platinum.

EXAMPLE 1

Catalyst C1 to be Used According to the Invention

As in comparative example CC1, a catalyst was produced which additionally contains 150 g/l of a high surface-area cerium oxide with a cerium oxide content of 100 wt. %. 0.106 g/l of palladium was applied to the cerium oxide by stirring palladium nitrate into the coating suspension.

FIGS. 1 and 2 show the CO conversion of comparison catalyst CC1 and of catalyst C1 as a function of temperature respectively after conditioning 1 and conditioning 2. While under typical diesel conditions (FIG. 1) the comparison catalyst CC1 displays the lowest CO light-off temperature at 195° C. (temperature at 80% CO conversion), the light-off temperature of the catalyst C1 is shifted to $T_{80}$<100° C. by conditioning 2 (FIG. 2). In contrast, the comparison catalyst CC1 does not display any change in light-off temperature even after conditioning 2.

EXAMPLE 1.2

Catalyst C1.2 to be Used According to the Invention

Catalyst C1.2 differs from catalyst C1 in that it does not contain any palladium.

EXAMPLE 2

Catalyst C2 to be Used According to the Invention

Catalyst C2 is produced in accordance with catalyst C1. In contrast to the latter, however, it contains only 1.77 g/l Pt and only 100 g/l of the high-surface-area cerium oxide, onto which the 0.106 g/l palladium is applied. The ratio of platinum to cerium oxide calculated as Pt in g/cft:cerium oxide in g/l amounts to 0.5.

COMPARATIVE EXAMPLE 2

Comparison Catalyst CC2

The comparison catalyst CC2 was produced in accordance with catalyst C2 with the difference that the catalyst CC2 does not contain any palladium.

FIG. 3 shows the CO conversion of catalysts C1, C1.2, C2 and CC2 after the lean/rich cycle according to conditioning 2. Catalysts C1, C1.2, C2 display a light-off temperature $T_{80}$ of below 100° C., while the light-off temperature $T_{80}$ of comparison catalyst CC2 is approximately 180° C. While catalysts C1 and C1.2, which have a Pt:CeO$_2$ ratio of 0.67, display a low CO light-off with or without additional palladium, catalysts C2 and CC2 with a low platinum loading (Pt:CeO$_2$ is in both cases 0.5) display low CO light-off only in the presence of palladium.

In the case of catalysts to be used according to the invention, the cerium oxide must be in close contact with a sufficient quantity of platinum and/or palladium. This takes place in catalyst C1.2 by mixing the Pt/alumina component with the cerium oxide in a washcoat suspension. If the Pt:cerium oxide ratio (in g/cft:g/l) is ≤0.5, the close contact between platinum and cerium oxide is no longer sufficient and the cerium oxide must be brought into close contact with additional noble metal, preferably palladium.

COMPARATIVE EXAMPLE 3

Comparison Catalyst CC3

To produce comparison catalyst CC3, an Mg/Al mixed oxide containing 18 wt. % MgO and 10 wt. % CeO$_2$ relative to the total weight of the mixed oxide and an aluminum oxide stabilized with 3 wt. % lanthanum oxide, which was additionally coated with 17 wt. % CeO$_2$, was coated with platinum using the incipient wetness method and suspended in water after thermal fixing of the platinum. The following further components were added to this coating dispersion palladium in the form of palladium nitrate;

a cerium mixed oxide containing 85 wt. % CeO$_2$, 5 wt. % La$_2$O$_3$, 5 wt. %, Al$_2$O$_3$ and 5 wt. % Pr$_6$O$_{11}$ relative to the mixed oxide which was coated with a barium compound (9 wt. % of barium calculated as oxide and relative to the total weight of the Ba/cerium mixed oxide compound); and an aluminum oxide stabilized with lanthanum oxide which was coated with rhodium from a rhodium nitrate solution using the "incipient wetness" method and subsequent thermal fixing.

With the resultant coating dispersion, comparison catalyst CC3 was produced in accordance with the method described for comparison catalyst CC1, said comparison catalyst containing 4.4 g/l noble metal relative to the volume of the finished catalyst with a ratio of Pt:Pd:Rh of 20:4:1.

EXAMPLE 3

Catalyst C3 to be Used According to the Invention

Catalyst C3 was produced exactly as in comparative example 3, wherein the cerium mixed oxide was replaced by a cerium oxide with 100 wt. % CeO$_2$. The resultant catalyst likewise contained 4.4 g/l noble metal relative to the volume of the finished catalyst with a ratio of Pt:Pd:Rh of 20:4:1.

FIG. 4 shows the CO conversion of comparison catalyst CC3 and catalyst C3 under typical diesel conditions (conditioning 1) and after use of a lean/rich cycle (conditioning 2). After conditioning 2, both catalysts display a distinct reduction in CO light-off temperature, but only catalyst C3 displays a light-off temperature below 130° C., with $T_{80}$=125° C., FIG. 5 shows how the CO light-off behavior of catalyst C1 changes under lean conditions through the influence of the temperature of the catalyst. To this end, the first light-off test was stopped at 350° C., the temperature reduced and the next light-off test started. Catalyst C1 thus experienced this temperature prior to the light-off test denoted C1 −350° C. This was repeated with temperatures 400° C. and 500° C. It is apparent that, as the temperature to which the catalyst C1 is exposed under lean exhaust gas conditions increases, the light-off temperature rises. If the CO light-off temperature of catalyst C1 is to be kept below 150° C., after a temperature excursion to 400° C. activity must be re-established by application of a pulse of rich exhaust gas.

The invention claimed is:

1. A method for removing carbon monoxide and hydrocarbons from the exhaust gas of lean-burn internal combustion engines, wherein the exhaust gas is passed over a catalyst which contains
   (i) platinum supported on one or more refractory supporting materials,
   (ii) pure cerium oxide, and
   (iii) if the ratio of platinum to cerium oxide is ≤0.5 (calculated as Pt in g/cft:cerium oxide in g/l), an additional noble metal selected from the group consisting of platinum, palladium, rhodium and mixtures thereof,
   wherein the pure cerium oxide (ii) being in close contact with platinum (i) and, if included, additional noble metal (iii),
   wherein, after a limit temperature exposure under lean exhaust gas conditions is exceeded, the catalyst is exposed for a short time to rich exhaust gas to regenerate catalytic activity.

2. The method as claimed in claim 1, wherein the quantity of platinum (i) amounts to 0.4 to 2 wt. % relative to the total weight of components (i) to (iii).

3. The method as claimed in claim 1 wherein palladium is supported on the one or more refractory supporting materials in addition to platinum.

4. The method as claimed in claim 3, wherein the quantity of palladium is selected such that, relative to component (i), a ratio by weight of Pt:Pd of 2:1 to 10:1 results.

5. The method as claimed in claim 1, wherein aluminum oxide, silicon oxide, magnesium oxide, titanium oxide, cerium oxide, zeolite, or mixtures of mixed oxides thereof are used as refractory supporting materials for component (i).

6. The method as claimed in claim 1, wherein the pure cerium oxide contains 90 to 100 wt. % cerium oxide relative to the total weight of the pure cerium oxide.

7. The method as claimed in claim 1, wherein the catalyst comprises the additional noble metal (iii), and the additional noble metal (iii) is used in quantities of 0 to 0.5 wt. %, relative to the total weight of components (i) to (iii).

8. The method as claimed in claim 1, wherein the short time for which the catalyst is exposed to rich exhaust gas is a time of 1 to 10 seconds.

9. The method as claimed in claim 1, wherein the limit temperature exposure is defined as a limit temperature which, if exceeded, triggers regeneration.

10. The method as claimed in claim 9, wherein the limit temperature amounts to 400° C., if the $T_{50}$ value for CO light-off is to be 150° C.

11. The method as claimed in claim 9, wherein the limit temperature amounts to 350° C., if the $T_{50}$ value for CO light-off is to be 125° C.

12. The method as claimed in claim 1, wherein the limit temperature exposure is defined as a residence time of the catalyst in previously defined temperature classes which, if exceeded, triggers regeneration.

13. The method as claimed in claim 12, wherein
   a.) the temperature of the catalyst is measured or simulated and the residence time in a temperature class is determined or the residence time in a plurality of defined temperature classes is determined and added up,
   b.) on a given upper limit for the residence time being exceeded, the need for regeneration of the catalyst is identified,
   c.) on or after the temperature falling below a further limit temperature, the engine is changed over to rich exhaust gas for a short period, and
   d.) on or after completion of regeneration of the catalyst with rich exhaust gas, the residence times of all the temperature classes are reset to zero.

14. The method as claimed in claim 1, wherein the engine is switched off if it is exposed to rich exhaust gas.

* * * * *